(12) United States Patent
Kao et al.

(10) Patent No.: US 10,006,934 B2
(45) Date of Patent: Jun. 26, 2018

(54) METHOD FOR DETERMINING ANTIFOULING ABILITY OF A MATERIAL SURFACE AND DETERMINING DEVICE FOR DETERMINING ANTIFOULING ABILITY OF MATERIAL SURFACE

(71) Applicant: INDUSTRIAL TECHNOLOGY RESEARCH INSTITUTE, Hsinchu (TW)

(72) Inventors: Feng-Sheng Kao, Hsinchu (TW); Jen-You Chu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days. days.

(21) Appl. No.: 15/383,045

(22) Filed: Dec. 19, 2016

(65) Prior Publication Data
US 2017/0299627 A1 Oct. 19, 2017

(30) Foreign Application Priority Data
Apr. 15, 2016 (TW) .............................. 105111775 A

(51) Int. Cl.
*G01Q 60/28* (2010.01)
*G01Q 60/38* (2010.01)
*G01Q 60/42* (2010.01)

(52) U.S. Cl.
CPC ............ *G01Q 60/28* (2013.01); *G01Q 60/42* (2013.01)

(58) Field of Classification Search
CPC ........ G01Q 60/28; G01Q 60/38; G01Q 60/22; G01Q 70/14; G01N 19/04; G01N 13/00
(Continued)

(56) References Cited

U.S. PATENT DOCUMENTS 5,477,732 A * 12/1995 Yasue .................... B82Y 35/00
257/E21.525
5,656,441 A 8/1997 Faller et al.
(Continued)

FOREIGN PATENT DOCUMENTS

CN 102023130 B 6/2012
CN 102937571 A 2/2013
(Continued)

OTHER PUBLICATIONS

Taiwanese Office Action and Search Report issued in Taiwanese Application No. 105111775, dated Jul. 20, 2017.
(Continued)

*Primary Examiner* — David A Vanore
(74) *Attorney, Agent, or Firm* — Birch, Stewart, Kolasch & Birch, LLP

(57) ABSTRACT

A method for determining antifouling ability of a material surface is provided. The method includes (a) providing a determining device. The determining device includes a probe and a determining unit with a spring characteristic structure. The probe includes a micro particle or a micro particle and a pollutant fixed on a surface of the micro particle. The probe is fixed at one end of the spring characteristic structure. After the step (a), the method further includes (b) contacting the probe with a material surface-to-be-determined, (c) deforming the spring characteristic structure until the probe departs from the material surface-to-be-determined to recover the spring characteristic structure, and determining the level of the deformation, (d) determining the adhesion value of the probe to the material surface-to-be-determined using the deformation and (e) determining the antifouling ability of the material surface.

19 Claims, 8 Drawing Sheets

(58) Field of Classification Search
USPC .................................. 850/33, 1, 21, 40, 56
See application file for complete search history.

(56) References Cited

U.S. PATENT DOCUMENTS

| | | | | |
|---|---|---|---|---|
| 6,880,386 | B1* | 4/2005 | Krotil | B82Y 35/00 73/105 |
| 7,278,296 | B2* | 10/2007 | Kitamura | G01Q 10/065 73/105 |
| 7,360,404 | B2* | 4/2008 | Reinstadtler | B82Y 35/00 73/105 |
| 7,555,940 | B2* | 7/2009 | Su | B82Y 35/00 73/105 |
| 7,877,816 | B2* | 1/2011 | Spizig | B82Y 35/00 850/10 |
| 7,908,908 | B2* | 3/2011 | Brown | G01Q 60/42 73/105 |
| 8,387,443 | B2* | 3/2013 | King | G01Q 60/38 73/105 |
| 8,726,411 | B1* | 5/2014 | Tseng | G01Q 60/30 374/120 |
| 8,959,661 | B2* | 2/2015 | Polesel-Maris | B82Y 35/00 250/458.1 |
| 9,028,603 | B2* | 5/2015 | Detty | C01B 33/16 106/287.1 |
| 2006/0043276 | A1* | 3/2006 | Saito | G01Q 60/22 250/234 |
| 2010/0011472 | A1* | 1/2010 | Hugel | G01N 33/54373 850/59 |
| 2012/0054924 | A1* | 3/2012 | Zhang | G01Q 60/58 850/6 |
| 2014/0299538 | A1* | 10/2014 | Gleason | B01D 65/08 210/500.28 |
| 2017/0299627 | A1* | 10/2017 | Kao | G01Q 60/28 |

FOREIGN PATENT DOCUMENTS

| | | |
|---|---|---|
| JP | 10-206312 A | 8/1998 |
| JP | 2002-273700 A | 9/2002 |
| JP | 3322174 B2 | 9/2002 |
| JP | 2004-144573 A | 5/2004 |
| JP | 2007-169814 A | 7/2007 |
| JP | 2008-239468 A | 10/2008 |
| JP | 2009-120771 A | 6/2009 |
| JP | 2013-19714 A | 1/2013 |
| TW | 201249904 A1 | 12/2012 |
| TW | I385375 B1 | 2/2013 |
| TW | 201512341 A | 4/2015 |

OTHER PUBLICATIONS

American Society for Testing and Materials (ASTM), "Standard Practice for Evaluating Biofouling Resistance and Physical Performance of Marine Coating Systems", Designation: D6990-05 (Reapproved 2011), 13 pages.

American Society for Testing and Materials (ASTM), "Standard Practice for Testing Biofouling Resistance of Marine Coatings Partially Immersed", Designation: D5479-94 (Reapproved 2013), 2 pages.

Fahs et al., "Plant protein interactions studied using AFM force spectroscopy: nanomechanical and adhesion properties", Phys. Chem. Chem. Phys., vol. 15, 2013, pp. 11339-11348.

Liu et al., "Investigation of antifouling universality of polyvinyl formal (PVF) membranes utilizing atomic force microscope (AFM) force curves", The Royal Society of Chemisty, vol. 5, 2015, pp. 36894-36901.

Japanese Notification of Reasons for Rejection and English translation for Application No. 2017-054269, dated Feb. 20, 2018.

* cited by examiner

METHOD FOR DETERMINING ANTIFOULING ABILITY OF A MATERIAL SURFACE AND DETERMINING DEVICE FOR DETERMINING ANTIFOULING ABILITY OF MATERIAL SURFACE

CROSS REFERENCE TO RELATED APPLICATIONS

The application is based on, and claims priority from, Taiwan Application Serial Number 105111775, filed on Apr. 15, 2016, the disclosure of which is hereby incorporated by reference herein in its entirety.

TECHNICAL FIELD

The technical field relates to a method for determining the antifouling ability of a material surface and a determining device thereof.

BACKGROUND

The adhesion of dirt onto surfaces, or biofouling, poses a problem not just in general livelihood, but also in a wide variety of industries. However, fouling relating to biofilm occurs. The term "biofilm" employed herein refers to the adhesion of organics or microorganisms in water, which begin secreting mucus, growing, and causing a thin film to be formed. Once this film changes the surface properties of the original material, it can easily cause the adhesion of algae or shellfish.

The accumulation of biofouling will gradually damage materials and properties. Hence, various anti-fouling materials or anti-adhesion material development is now an important issue. The current methods for measuring the anti-fouling or anti-sticking ability of a material are contact angle measurement, microbiological culturing, and washing the material of the surface and calculating the number of residual fouling. The disadvantage of the contact angle method is that it only determines hydrophilic or hydrophobic, and is unable to actually measure the anti-sticking ability of the dirt on surfaces. Only calculating the surface amount is imprecise because uneven residual dirt on the surface will lead to misleading results and affect the performance of the product. Cultured microorganisms or cleaning the surface are time-consuming and lead to the evaluation much costs.

Another method for evaluation of biofouling is ASTM gold standard verification (ASTM D6990: Standard Practice for Evaluating Biofouling Resistance and Physical Performance of Marine Coating Systems). In this method, the antifouling evaluation is based on calculating the adhesion area of dirt on the surface after soaking the antifouling material in water for a few weeks to several months.

The above methods require a long time, and can even take several weeks or months. Therefore, a novel, quick, and accurate method for determining the antifouling ability of a material surface is called for to solve the above problems.

SUMMARY

According to embodiments of the disclosure, the disclosure provides a method for determining the antifouling ability of a material surface, including: (a) providing a determining device, wherein the determining device includes: a probe, wherein the probe includes a micro particle or includes a micro particle and a pollutant fixed on a surface of the micro particle; and a determining unit with a spring characteristic structure, wherein the probe is fixed at one end of the spring characteristic structure; (b) contacting the probe with a material surface-to-be-determined to make the micro particle itself or the pollutant on the surface of the micro particle adhere to the material surface-to-be-determined; (c) deforming the spring characteristic structure until the probe departs from the material surface-to-be-determined to recover the spring characteristic structure, and determining the level of the deformation using the determining unit; (d) determining an adhesion value of the probe to the material surface-to-be-determined using the deformation; and (e) determining the antifouling ability of the material surface according to the adhesion value.

According to another embodiment of the disclosure, the disclosure also provides a determining device for determining the antifouling ability of a material surface, including a probe and a determining unit. The probe includes a micro particle, or it includes a micro particle and a pollutant fixed on a surface of the micro particle. The determining unit has a spring characteristic structure. The probe is fixed at one end of the spring characteristic structure. A antifouling ability of a material surface is determined by an adhesion value of the probe to the material surface-to-be-determined A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

In one embodiment, a method for determining the antifouling ability of a material surface.

Figure 1:
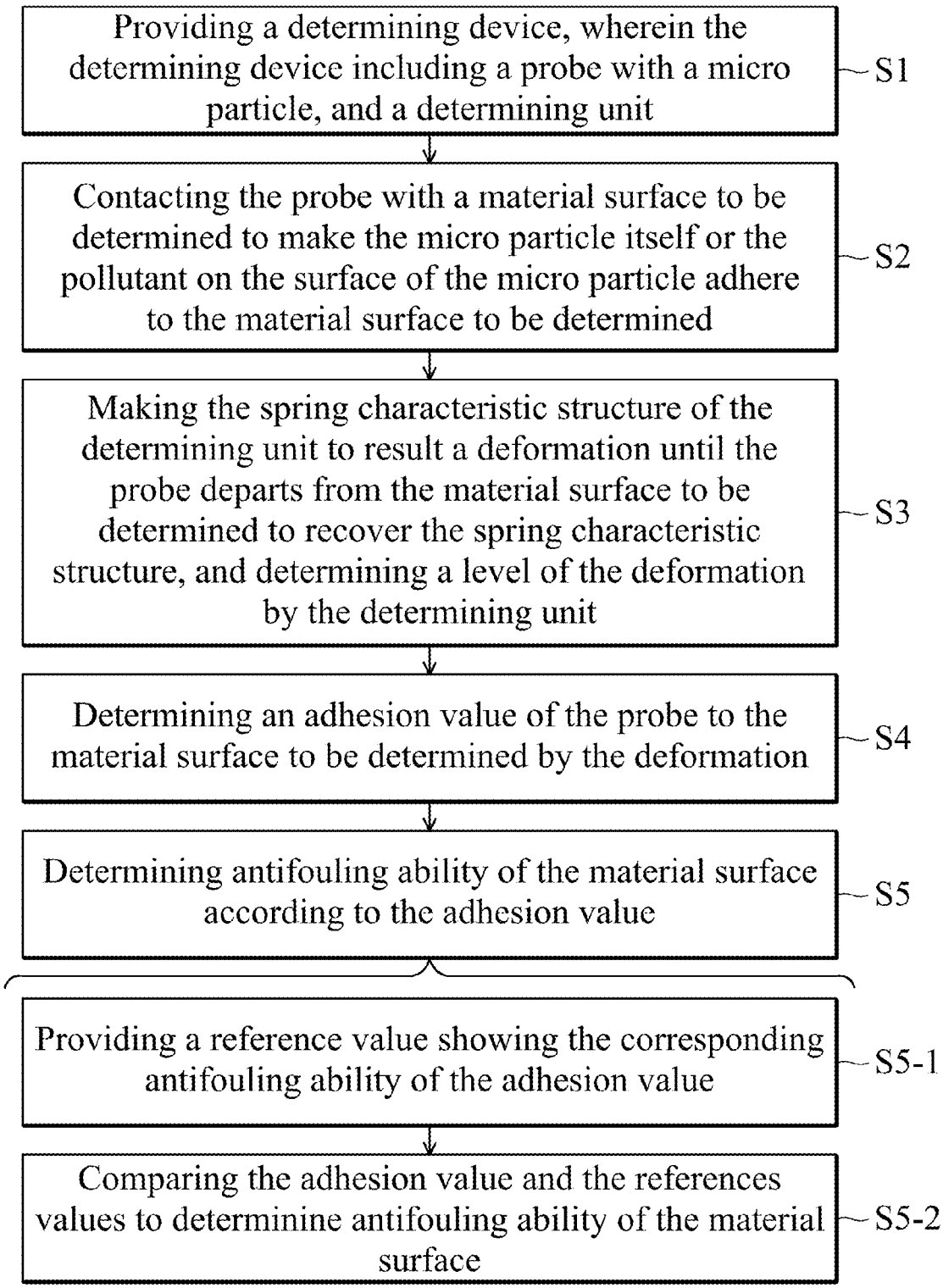
FIG. 1 shows a flow diagram of a method for determining the antifouling ability of a material surface according to an embodiment of the disclosure.

FIG. 1 shows a flow diagram of a method for determining the antifouling ability of a material surface in one embodiment of the disclosure. As shown in FIG. 1, the method for determining the antifouling ability of a material surface 10 may include the following steps, but it is not limited thereto.

Figure 2:
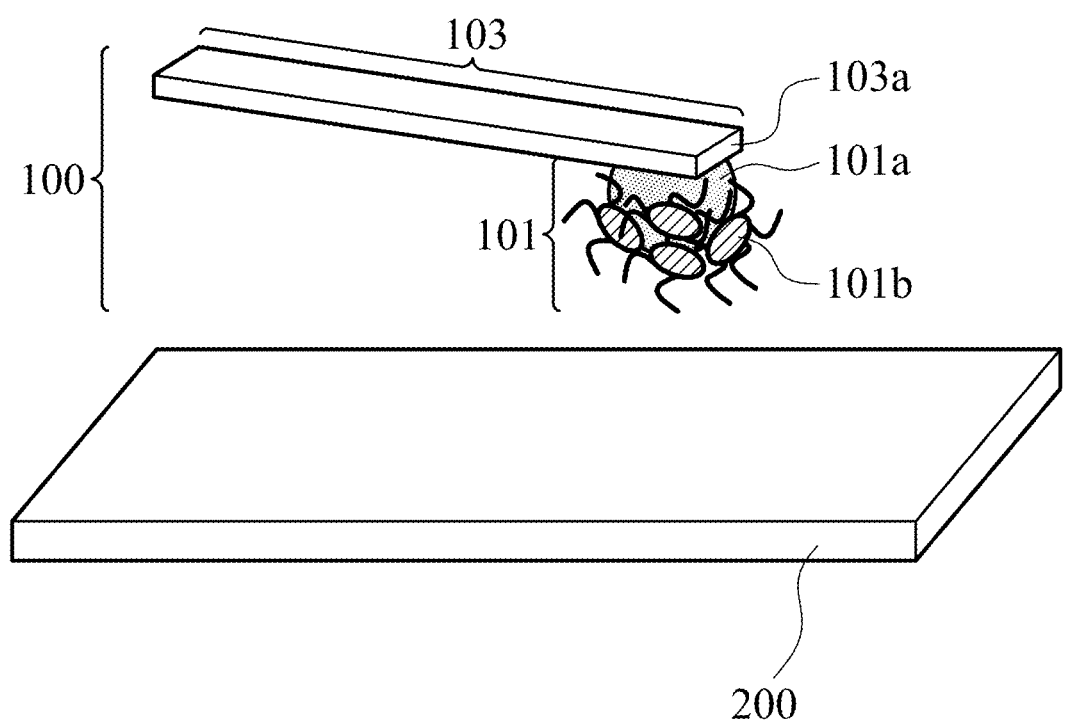
FIG. 2 shows a diagram overview the determining device for determining the antifouling ability of a material surface according to an embodiment of the disclosure.

A method of determining the antifouling ability of a material surface 10 is provided. First, a determining device (step 1) is provided. Refer to FIG. 2. The determining device 100 may include a probe 101 and a determining unit 103, but it is not limited thereto.

The probe 101 of the determining device 100 includes a micro particle 101a or it includes a micro particle 101a and a pollutant 101b, wherein the pollutant 101b is fixed on a surface of the micro particle 101a. When the probe 101 includes the micro particle 101a only, the micro particle 101a is regarded as a pollutant. When the probe 101 includes a micro particle 101a and a pollutant 101b, the pollutant 101b is fixed on a surface of the micro particle 101a and the method of fixing the pollutant 101b on the surface of the micro particle 101a is not particularly limited. For example, the affixing method may be physical adsorption or chemical modification, but it is not limited thereto.

The surface coverage of the pollutant 101b on the micro particle 101a is 50-100%, but it is not limited thereto. In one embodiment, the surface coverage of the pollutant 101b on the micro particle 101a is 60-70%.

The shape of the micro particle 101a may comprise a sphere, tip, pillar, taper, etc., but it is not limited thereto. In another embodiment, the shape of the micro particle is spherical. Furthermore, the material of the micro particles 101a may comprise silicon dioxide, glass, metal, metal coated substrates, polystyrene, poly (methyl methacrylate), melamine, polylactic acid, etc., but it is not limited thereto. In another embodiment, the material of the micro particles 101a is silicon dioxide. The size of the micro particles 101a may be about 0.1 μm-100 μm, but it is not limited thereto.

The above pollutant 101b fixed on a surface of the micro particle 101a is not particularly limited, and it may be in the form of a pollutant, such as a pollutant in the air, a pollutant in a water source, etc., or the above pollutant 101b may, for example, be in the form of an inorganic substance, organic acid, proteins, carbohydrates, microorganisms, but it is not limited thereto. In one embodiment, the above inorganic substance may include silicon oxide, calcium oxide, aluminum oxide, iron oxide, etc., but it is not limited thereto. The above organic acids may include humic acid, fulvic acid, etc., and in one embodiment, the above organic acids are humic acid. The above carbohydrate may comprise polysaccharides, such as chitosan, etc., but it is not limited thereto.

The above pollutant 101b fixed on a surface of the micro particle 101a comes from a water source. The above water source includes fresh water or brackish water. The fresh water may include rivers, freshwater lakes, groundwater, running water, but it is not limited thereto. The brackish water may include water from an ocean or salt lake, but it is not limited thereto. The pollutant coming from a water source is not particularly limited, for example, it can be an inorganic substance, organic acids, proteins, carbohydrates, microorganisms, but it is not limited thereto. The inorganic substance of the pollutant that comes from a water source may include silicon oxide (such as silica), calcium oxide, aluminum oxide or iron oxide, but it is not limited thereto. In some embodiments, an inorganic substance of the pollutant that comes from a water source is silicon oxide. Furthermore, the organic acid of the pollutant that comes from a water source may include humic acid or fulvic acid. In one embodiment, the organic acid of the pollutant that comes from a water source is humic acid. The above carbohydrate may include polysaccharides, such as chitosan, but it is not limited thereto. In one embodiment, the above carbohydrate is chitosan.

In the determining device 100, the determining unit 103 includes a spring characteristic structure 103a, but it is not limited thereto. Herein the term "spring characteristic structure" means a structure or a device with spring properties, and when subjected to a load, the structure or the device may exhibit the right amount of deformation, while after the load is removed, the structure or the device is then capable of restoring to its original shape or position. The term "load" is used herein to refer to a force or weight, such as tension, compression, or attraction, but it is not limited thereto.

In the determining device 100, the probe is fixed at one end of the spring characteristic structure 103a. The spring characteristic structure 103a may include a cantilever, laser optical tweezers, but it is not limited thereto. In one embodiment, the above spring characteristic structure 103a may be a cantilever.

Next (step S2), in a method of determining the antifouling ability of a material surface 10, to contact the probe 101 of the determining device 10 with a material surface 200-to-be-determined (step S2), and to make the probe 101 of the micro particle 101a itself or the pollutant 101b on the surface of the micro particle adhere to the material surface 200. The time for contacting of the probe 101 of the determining device 10 and the material surface 200 is not particularly limited, but usually the probe 101 contacts the material surface 200 and then moves out, for example, the contacting time may be about 0.01-60 seconds, but it is not limited thereto. In one embodiment, the contacting time is 1 second.

Next (step S3), in a method of determining the antifouling ability of a material surface 10, after contacting the probe 101 of the determining device 10 with a material surface 200-to-be-determined, the spring characteristic structure 103a results in a deformation until the probe 101 departs from the material surface 200-to-be-determined to recover the spring characteristic structure 103a, and a determination is made as to the level of the deformation by the determining unit 103 (step S3). The determining the level of deformation is output from the determining unit 103 is not particularly limited, for example, the determining the level of deformation is output from the determining unit 103 in a form of voltage or offset value, but it is not limited thereto.

Furthermore, in a method of determining the antifouling ability of a material surface 10, to determine the level of deformation of the probe 101 to obtain the adhesion value of the material surface 200 (step S4), after deforming the spring characteristic structure 103a, the probe 101 departs from the material surface-to-be-determined to recover the spring characteristic structure 103a.

Then, the antifouling ability of the material surface 200 is determined according to the adhesion value (step S5).

In another embodiment of the disclosure, using the adhesion value to determine the antifouling ability of the material surface 200 may further comprise the steps below.

Providing reference values showing the corresponding antifouling ability of the adhesion value range (step S5-1). The reference values can be defined in advance, and they are not particularly limited. For example, the corresponding antifouling ability is classified as no antifouling performance when the adhesion value is more than 8 nN; classified as poor antifouling performance when the adhesion value is 3-8 nN; classified as fair antifouling performance when the adhesion value is 0.6-3 nN; and classified as good antifouling performance when the adhesion value is 0-0.6 nN.

Next, the adhesion value of probe 101 is compared with the provided corresponding antifouling ability of the adhesion value to diagnose the level of the antifouling performance (step S5-2).

Moreover, according to embodiments of the disclosure, in the method of determining the antifouling ability of a material surface 10 of the disclosure, wherein the pollutant 101b is fixed on a surface of the micro particle 101a, the pollutant comes from a water source, and the above-described steps S1 to S3 are performed in water. In one embodiment, wherein the pollutant 101b is fixed on a surface of the micro particle 101a, and wherein the pollutant 101b comes from fresh water, the above-described steps S1 to S3 are carried out in fresh water. According to another embodiment of the disclosure, wherein the pollutant 101b is fixed on a surface of the micro particle 101a, and wherein the pollutant 101b comes from brackish water, the above-described steps S1 to S3 are carried out in brackish water.

It is easily to diagnose the level of the antifouling performance of the test materials in the step of contacting the probe with the material surface according to the disclosures, so it can rapidly determine the antifouling ability and can significantly reduce costs. The method provided according to the disclosure can quickly and accurately finish determining the antifouling ability of a material surface and diagnose the level of the antifouling performance within 30 minutes, and one does not need to spend weeks or even months to confirm the antifouling performance of the material surface, as it is one of the world's most rapid and direct methods.

According to embodiments of the disclosure, a determining device for determining the antifouling ability of a material surface is provided.

According to embodiments of the disclosure, the determining device for determining the antifouling ability of a material surface of the disclosure refers again to FIG. 2. The determining device 100 for determining the antifouling ability of a material surface is not limited to a probe 101 and a determining unit 103.

In the probe 101 of the determining device 100 for determining the antifouling ability of a material surface, the probe 101 may include a micro particle 101a, or it may includes a micro particle 101a and a pollutant 101b fixed on a surface of the micro particle 101a. The surface coverage of the pollutant 101b on the micro particle 101a is 50-100%, but it is not limited thereto. In another embodiment of the disclosure, the surface coverage of the pollutant 101b on the micro particle 101a is 60-70%, but it is not limited thereto.

For details relating to the shape and material of the micro particle, and the pollutant fixed on the surface of the micro particle, please refer to the above method of determining the antifouling ability of a material surface.

The above determining unit 103 of the method of determining the antifouling ability of a material surface may have a spring characteristic structure 103, but it is not limited thereto. Here, the term "spring characteristic structure" is the same as the description above. Moreover, the probe 101 of the determining unit 103 is fixed at one end of the spring characteristic structure 103a, wherein the spring characteristic structure 103a comprises a cantilever, laser optical tweezers, but it is not limited thereto. In another embodiment of the disclosure, the spring characteristic structure 103a is cantilever.

According to embodiments of the disclosure, in the determining device 100 for determining the antifouling ability of a material surface, the adhesion value of the probe to the material surface-to-be-determined is determined, and the antifouling ability of the material surface is diagnosed according to the adhesion value.

Below, exemplary embodiments will be described in detail with reference to the accompanying drawings so as to be easily realized by a person having ordinary knowledge in the art. The concept of the disclosure may be embodied in various forms without being limited to the exemplary embodiments set forth herein. Descriptions of well-known parts are omitted for clarity, and like reference numerals refer to like elements throughout.

Materials and Methods

Chemicals

All chemicals were commercially available from Sigma-Aldrich, and names thereof are shown as below:

97% of (3-aminopropyl)trimethoxysilane,3-APTES); glutaraldehyde solution, grade II, 25% in the $H_2O$; (N-(3-Dimethylaminopropyl)-N'-ethylcarbodiimide hydrochloride, EDC); 98% of (N-hydroxysuccinimide, NHS); (bovine serum albumins, BSA); (humic Acid, HA)

2. Determining Device of Determining Unit.

According to embodiments of the disclosure, atomic force microscope, AFMs, (Bruker Bioscope Catalyst) is used as the determining device, wherein the cantilever of the micro meter level probe of the AFMs is used as the spring characteristic structure of determining unit.

Mechanism of AFMs are shown below:

AFMs measure the interaction between probe and sample at the time, which led to the cantilever bending, the detector of the AFM measures the bending of the cantilever and converts it into an electrical signal, which is converted to values. Laser beam deflection is the most common detection method used in modern commercial AFMs.

During the measurement, a minimum detection laser light is concentrated in the top of the cantilever; the cantilever surface will be smooth like a mirror, reflecting the laser beam. Once the cantilever angle changes, the angle of the reflected light will change. That is the optical lever principle. Therefore, as long as the cantilever is slightly bent, the light will lead to a substantial deflection. A laser beam was focused near the top of the cantilever tip, and a laser beam is focused on the back of a cantilever and reflected into a photodetector, which is a four-quadrant photodetector (quadrant photo-diode, QPD) after a quadrant photodiode detects the signal transmitted to a data processor, such as a computer, for signal processing. The force curve was obtained by pressing a hard surface, and the approach distance of the probe is known, the probe's level of deformation can be converted into a corresponding voltage that is a probe of sensitivity S, in units of nm/V.

Moreover, from Hooke's Law; $F=k \cdot x$ ($F$=Force; $k$=spring constant (Units of N/m); $x$=cantilever deflection), the cantilever deflection can be converted into force. Vendors will be based on the model of the probe to provide a spring constant. However, even if the same type of probe is used, there are still some differences in the spring constant of each probe. Therefore, in order to obtain precise signals, in one embodiment, before the experiment is corrected for the spring constant of the probe, and the probe by measuring the resonant frequency, the quality factor and the resonance amplitude can be obtained from the spring constant $k$.

Furthermore, the voltage signal of the probe multiplied by the spring constant of the probe and the sensitivity of the probe can be obtained from the cantilever deflection.

According to embodiments of the disclosure, the spring constant of cantilever was 0.12 N/m.

3. Preparation of Pollutants Probe Step

Quartz particles were stuck to the cantilever of the micro meter level by an epoxy resin, then placed in a UV ozone processor, and then irradiated with UV light for 20 minutes, thereby forming OH functional groups on the surface of the quartz particles. The quartz particles that were stuck to the cantilever of the micro meter level were immersed in an alcohol dilution of 1% 3-aminopropyl trimethoxy silane for 1 hour, thereby forming $NH_2$ functional groups on the surface of the quartz particles.

The surface of the quartz particles was then modified with a pollutant.

(1) Bovine Serum Albumin (BSA) as a Pollutant

The quartz particles referenced above (having surface with an $NH_2$ functional group), were immersed in a deionized solution of 2.5% glutaraldehyde for 30 minutes, thereby forming the aldehyde functional group on the surface of the quartz particles. Furthermore, a placed probe is then immersed in water for common proteins such as BSA (1 mg/ml in PBS) for 2 hours, thereby connecting the aldehyde functional group on the surface of the quartz particles and the $NH_2$ functional group of the BSA. As a result, the surface of the quartz particles was already modified by the pollutant (i.e. BSA).

(2) Humic Acid (HA) as a Pollutant

When a pollutant without an $NH_2$ functional group, but having a surface with COOH functional groups such as humic acid, by 3-(ethyliminomethyleneamino)-N,N-dimethyl-propan-1-amine(EDC) or N-Hydroxysuccinimide (NHS), activates the functional group, covalent bonds are thereby formed between the pollutant and the $NH_2$ functional groups of the micro particle. 0.2 M of 3-(ethyliminomethyleneamino)-N,N-dimethyl-propan-1-amine(EDC), 0.05M of N-Hydroxysuccinimide (NHS) and 0.5 mg/ml of humic acid with 2:2:1 volume ratio are mixed for 10 minutes. The quartz particles was stuck to the cantilever of micro meter level, (having a surface with NH2 functional group), was immersed in (EDC/NHS/HA 2:2:1) for 3 hours As a result, the surface of the quartz particles was already modified by the pollutant.(i.e. HA).

(3) Chitosan as a Pollutant

Above the quartz particles (having surface with an $NH_2$ functional group), was immersed in a deionized solution of 2.5%glutaraldehyde for 30 minutes, thereby forming the aldehyde functional group on the surface of the quartz particles. Furthermore, placed probe is then immersed in water for common carbohydrates such as chitosan (1 mg/ml in glacial acetic acid) for 2 hours, thereby connecting the aldehyde functional group on the surface of the quartz particles and the $NH_2$ functional group of the chitosan. As a result, the surface of the quartz particles was already modified by the pollutant. (i.e. BSA).

4. Analysis of a Surface Coverage of the Pollutant on the Micro Particle

The surface coverage of the pollutant on the micro particle due to cannot be directly was measured, therefore, by the surface of the quartz particles was then modified with a pollutant, after using AFMs determining pollutant of the substrate, as a surface coverage of the pollutant on the micro particle.

The pollutants (such as BSA, humic acid and chitosan) are respectively modified on the silicon oxide substrates, after the measurement of the surface coverage of the BSA, humic acid and chitosan on the micro particle.

5. Comparative of Shape of the Probe

Respectively modified the BSA on the micro particle and commercial AFM's probe thereby forming shape of probe are spherical, tip.

Setting scan parameters of AFMs (the spring constant was 0.12 N/m), respectively placing the above two shape type of probe contacting with the glass in water, and determining of two types of probes to glass surface of the adhesion value.

Setting Scan Parameters of AFMs (a) Approach of probe distance/withdraw of probe distance: 1000 nm (b) Scan rate of probe:1000 nm/s (c) Contacting time of probe sample: 1 sec (d) Number of samples: each of the samples has at least 15 different measuring points.

6. Determining the Antifouling Ability of Various Materials.

(1) Measurement of the Silicon Oxide Probe, BSA Probe, and Humic Acid Probe.

(i) Preparation of the test material.

A commercially available membrane XLE (from DOW-Film Tec, Edina, Minn., USA) placing in three type was prepared to test material-to-be-determined: (i) untreated; (ii) alcohol washing (Ultrasonic for 30 minutes); (iii) PEG (polyethylene glycol, PEG) coated on membrane XLE (thickness of 200 nm). In addition, the nano fiber membrane polyE (produced by the Industrial Technology Research Institute) was used as samples of test material. Placing all samples of test material stuck to on a slide, drops the salt water on the slide (concentration 32000 ppm; pH 7.5) and determined was carried out in the water.

(ii) Determining of Various Probe to the Test Material Surface of Adhesion Value As described above, respectively modified the pollutants (such as BSA and humic acid) on the spherical of quartz particles thereby forming BSA probe and humic acid probe, and the other providing directly quartz particles (unmodified) as a probe. Setting scan parameters of AFMs (the spring constant was 0.12 N/m), placing the above various probe contacting with the test material surface, and determining of various probes to the test material surface of adhesion value.

Setting Scan Parameters of AFMs (a) Approach of probe distance/withdraw of probe distance: 1000 nm (b) Scan rate of probe:1000 nm/s (c) Contacting time of probe sample: 1 sec (d) Number of samples: each of the samples has at least 15 different measuring points.

(2) Measurement of the Modified Chitosan of the Probe.

(i) Preparation of the Test Material.

Placing membrane of PEG and glass as test material. Placing all samples of test material was stuck to on a slide, drops the purified water on the slide and determined was carried out in the water.

(ii) Determining of Chitosan Probe to the Test Material Surface of Adhesion Value As described above, modified the chitosan on the spherical of quartz particles thereby forming chitosan probe. Setting scan parameters of AFMs (the spring constant was 0.12 N/m), placing the chitosan probe contacting with the test material surface, and determining of chitosan probe to the test material surface of adhesion value.

Setting Scan Parameters of AFMs.

(a) Approach of probe distance/withdraw of probe distance: 1000 nm (b) Scan rate of probe:1000 nm/s (c) Contacting time of probe sample: 1 sec (d) Number of samples: each of the samples has at least 15 different measuring points.

7. Classified antifouling performance of the test material surface according to the adhesion value.

(1) Preparation of the Test Material

A glass, commercially available from Dow Filmtec NF-270 and commercially available from Dow Filmtec NF-90, and a membrane of PEG were used as the test material. Placing all samples of test material was stuck to a slide, drops the purified water on the slide and determined was carried out in the water.

As described above, modified the BSA on the spherical of quartz particles thereby forming BSA probe. Setting scan parameters of AFMs (the spring constant was 0.12 N/m), respectively placing the probe contacting with the test material surface, and determining of various probes of the adhesion value.

The glass probe adhesion value is classified as no antifouling performance, and the corresponding antifouling ability of the test material surface according to the above adhesion value was classified as the antifouling performance of the test material surface according to the adhesion value.

B. Result

1. Determining Pollutant to Surface Coverage of Micro Particle

Figure 3A:
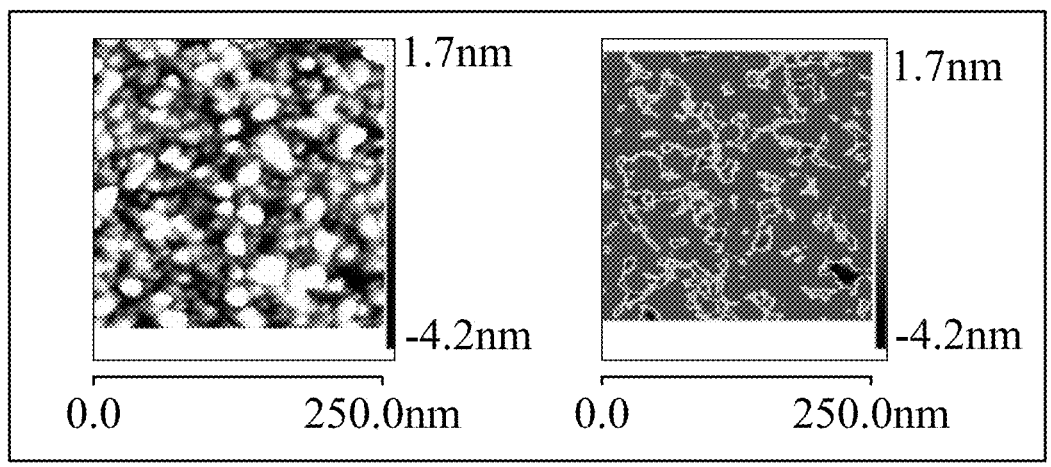
FIG. 3A shows an atomic force microscopy scanning results of bovine serum albumin modified substrate according to an embodiment of the disclosure.
Figure 3B:
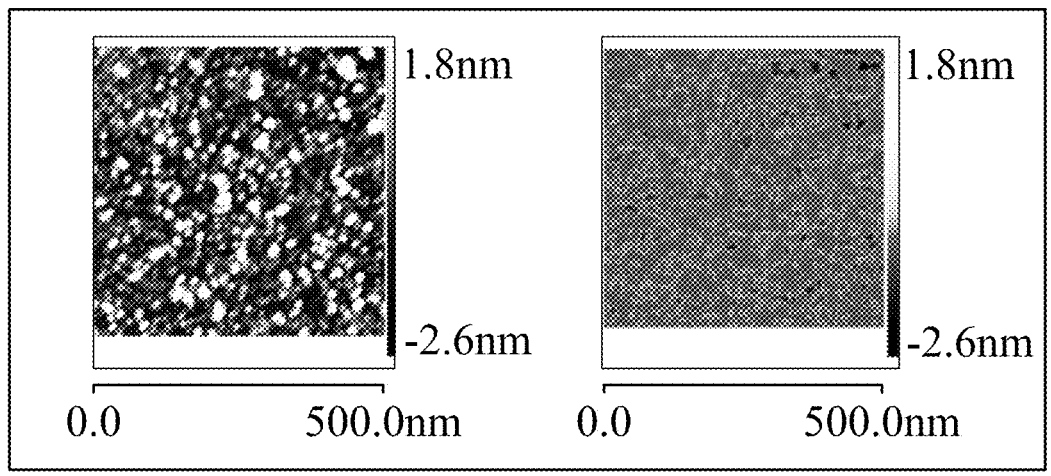
FIG. 3B shows an atomic force microscopy scanning results of humic acid modified substrate according to an embodiment of the disclosure.
Figure 3C:
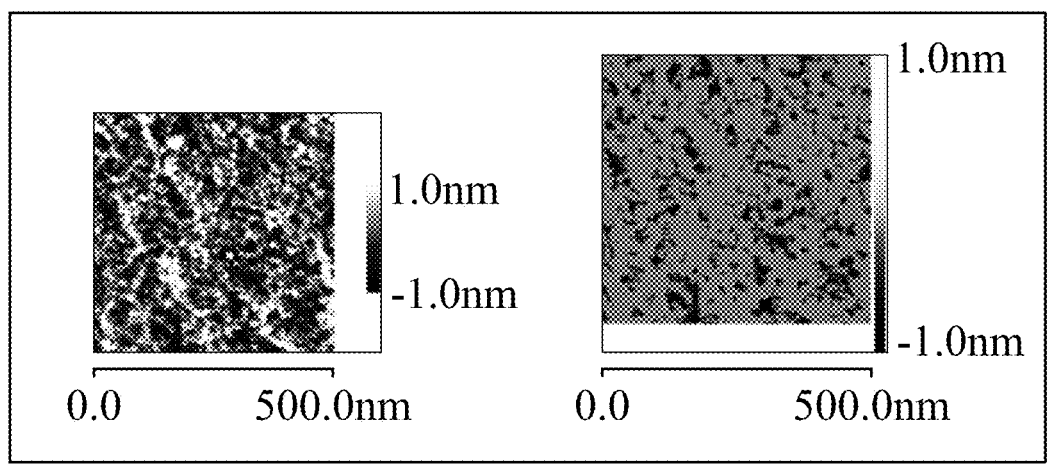
FIG. 3C shows an atomic force microscopy scanning results of chitosan modified substrate.

According to the above of substitute for determining pollutant to surface coverage of micro particle, and the result is shown in FIG. 3A-FIG. 3B and FIG. 3C.

Modified of bovine serum albumin on the substrate by atomic force microscopy, and the result is shown in FIG. 3A, wherein the particles are bovine serum albumin. And bovine serum albumin to surface coverage of substrate about 75.1% was determined by atomic force microscopy.

Modified of humic acid on the substrate by atomic force microscopy, and the result is shown in FIG. 3B, wherein the particles are humic acid. And humic acid to surface coverage of substrate about 65.2% was determined by atomic force microscopy.

Modified of chitosan on the substrate by atomic force microscopy, and the result is shown in FIG. 3B, wherein the particles is chitosan. And chitosan to surface coverage of substrate about 66.1% was determined by atomic force microscopy.

2. Comparative of Shape of the Probe

Figure 4:
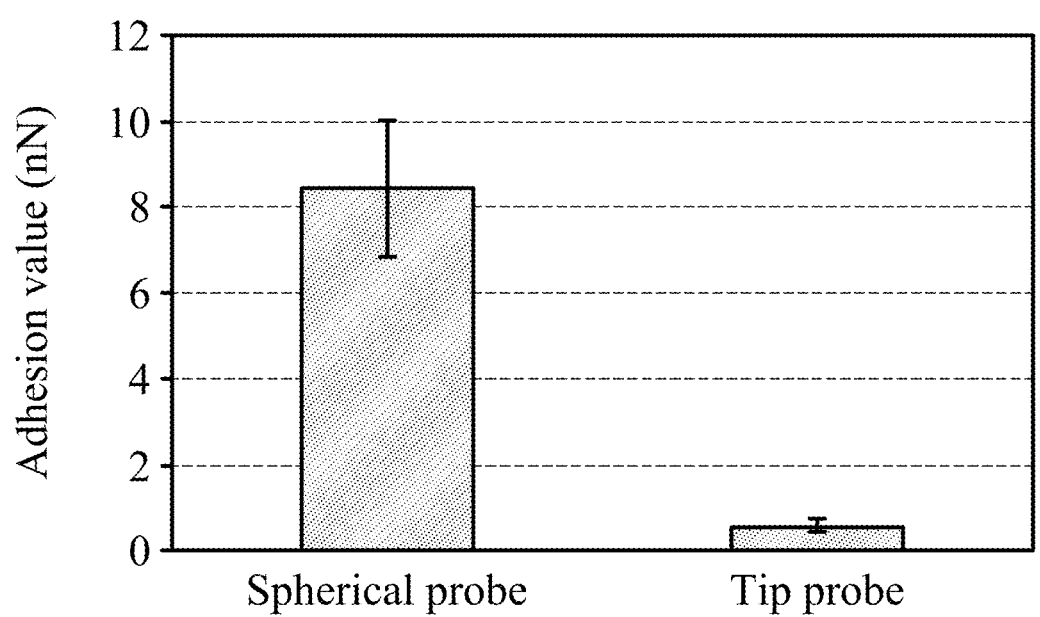
FIG. 4 shows the adhesion value of the spherical probe and tip probe to the glass surface according to an embodiment of the disclosure.

Modified the bovine serum albumin on the spherical, tip of probe to surface of glass of adhesion value were determined according to the above method. The results showed the spherical probe to glass of adhesion value is 8.45±1.6 nN, and the tip probe to glass of adhesion value is 0.59±0.14 nN (see FIG. 4)

According to the above results, the spherical probe to glass of adhesion value relative to the tip probe is large, adhesion value strong; representative to spherical probe to contact area of the test material surface is larger, means to area of sampling larger, therefore, the spherical probe amount of sampling more than the tip probe, the spherical probe respect to the tip probe is not easy due to particle of the failed contact, effect on determining result. Furthermore, since the spherical probe has enhancement effect of adhesion value, therefore it is relatively easy to diagnose material differences.

3. Determining the Antifouling Ability of the Test Material Surface.

Figure 5A:
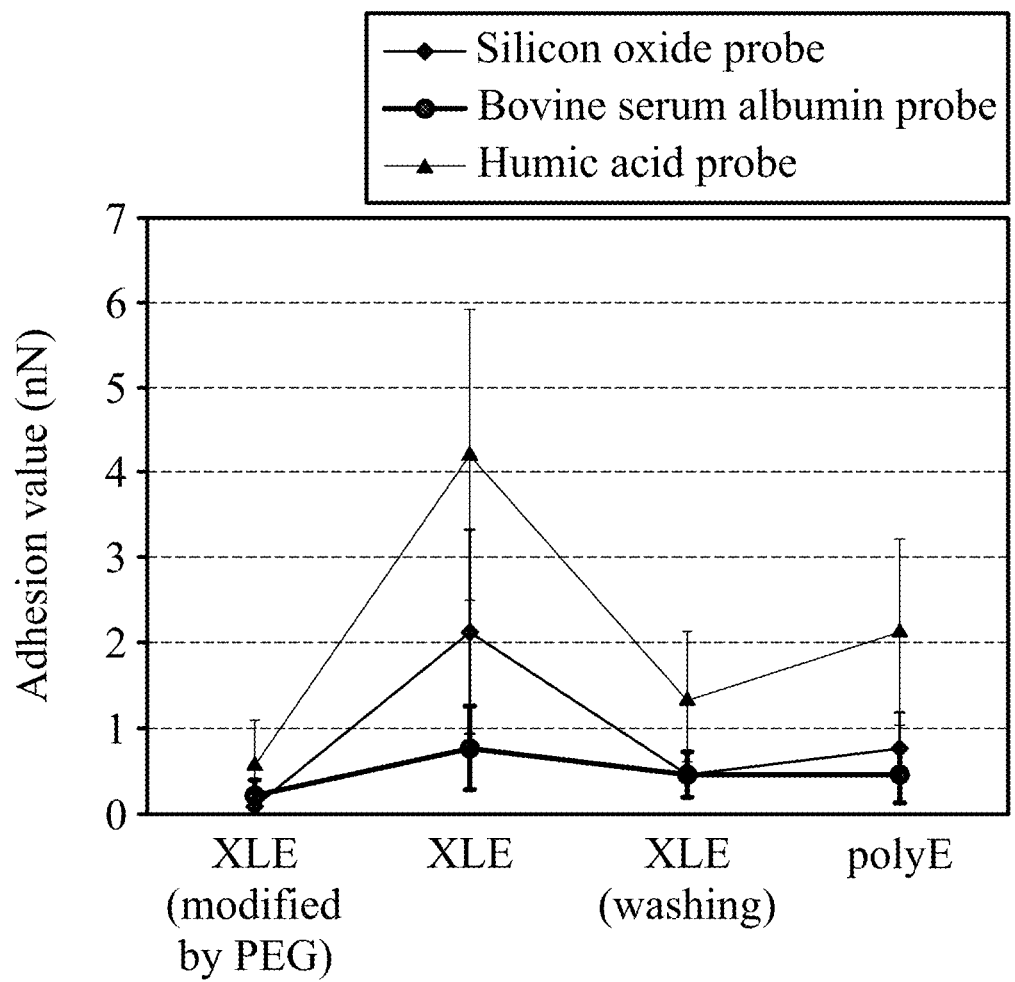
FIG. 5A shows the adhesion value of the silicon dioxide probe, bovine serum albumin probe and humic acid probe-to-be-determined in high salt concentrations in one embodiment of the disclosure.

(1) Determining by Silicon Oxide Probe, Bovine Serum Albumin Probe and Humic Acid Probe According to the above method, determining the antifouling ability of the silicon oxide probe, bovine serum albumin probe and humic acid probe to various of the test material surface, and the result is shown in table 1 and FIG. 5A.

TABLE 1 determining antifouling ability of various test material surfaces

| Determine of adhesion value (nN) | Bovine serum albumin probe | Humic acid probe | Silicon oxide probe |
|---|---|---|---|
| XLE (modified by PEG) | 0.195 ± 0.189 | 0.558 ± 0.496 | 0.088 ± 0.087 |
| XLE (untreated) | 0.756 ± 0.487 | 4.209 ± 1.708 | 2.123 ± 1.201 |
| XLE (alcohol washing) | 0.445 ± 0.262 | 1.367 ± 0.762 | 0.443 ± 0.270 |
| Nano fiber membrane polyE (produced by, ITRI) | 0.444 ± 0.339 | 2.126 ± 1.090 | 0.759 ± 0.413 |

According to Table 1 and FIG. 5, the results are known. Commercially available XLE is the most representative film of material with an antifouling ability. The membrane XLE to various probe of adhesion value are all below 0.6 nN (in salt water with a concentration of 32000 ppm and a pH of 7.5), which represents that polyethylene glycol coated film has good humic acid, protein, and silica antifouling properties. The above results are also consistent with the literature, and are therefore proof that the adhesion value of the detection system of the embodiments of the disclosure can be used as the method for determining the antifouling ability of a material surface.

In addition, Table 1 and FIG. 5 also show the results of measuring the other three membranes: commercially available XLE membrane (untreated), commercially available XLE membrane (alcohol washing), and nano fiber membrane polyE (produced by, ITRI). The results show that, compared the untreated with alcohol washing, after alcohol washing processed has gotten good at antifouling ability. Therefore, we considered to commercially available XLE membrane's surface layer is not the anti-adhesion layer, but rather the protective layer. Furthermore, the surface of the nano fiber membrane polyE has a polyamide membrane and, with alcohol washing commercially XLE membrane that antifouling ability properties are similar.

(2) Measured by the Chitosan Probe

Figure 5B:
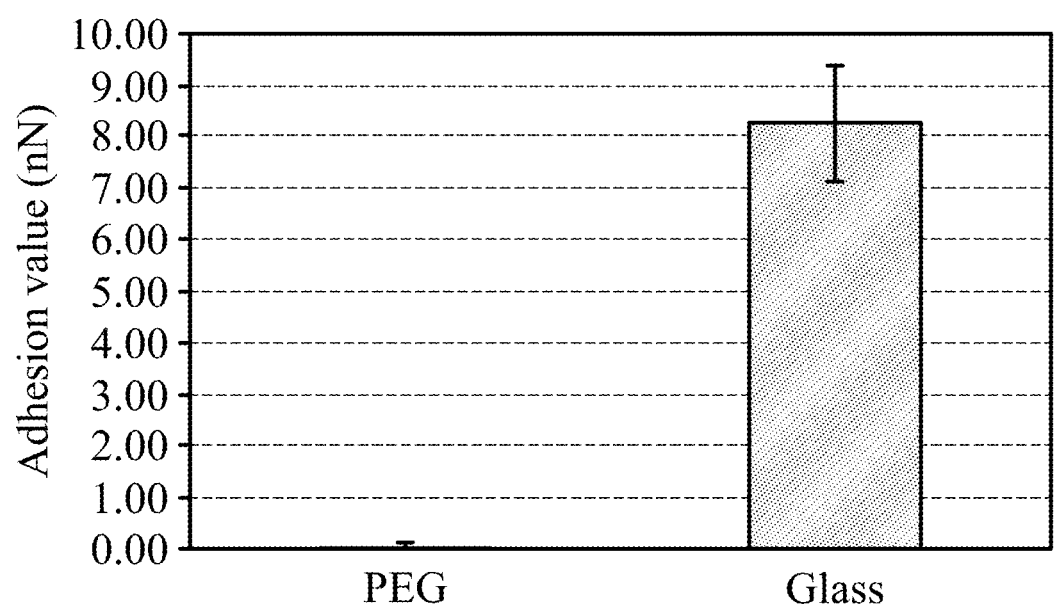
FIG. 5B shows the adhesion value of chitosan probe on various materials-to-be-determined is carried out in water according to an embodiment of the disclosure.

The results of the above method for determining the antifouling ability of the polyethylene glycol membrane and glass using a chitosan probe are shown in FIG. 5B.

According to FIG. 5B, the most representative material of the anti-adhesion value is a polyethylene glycol membrane, wherein the polyethylene glycol membranes to the anti-adhesion value of chitosan probe just only 0.04 nN (at purified water), means to the polyethylene glycol membranes to chitosan has good antifouling performance. When the adhesion value of chitosan probe to glass more than 8 nN is classified as no antifouling performance (at purified water).

3. Corresponding Antifouling Ability of Each the Adhesion Value Range

Figure 6:
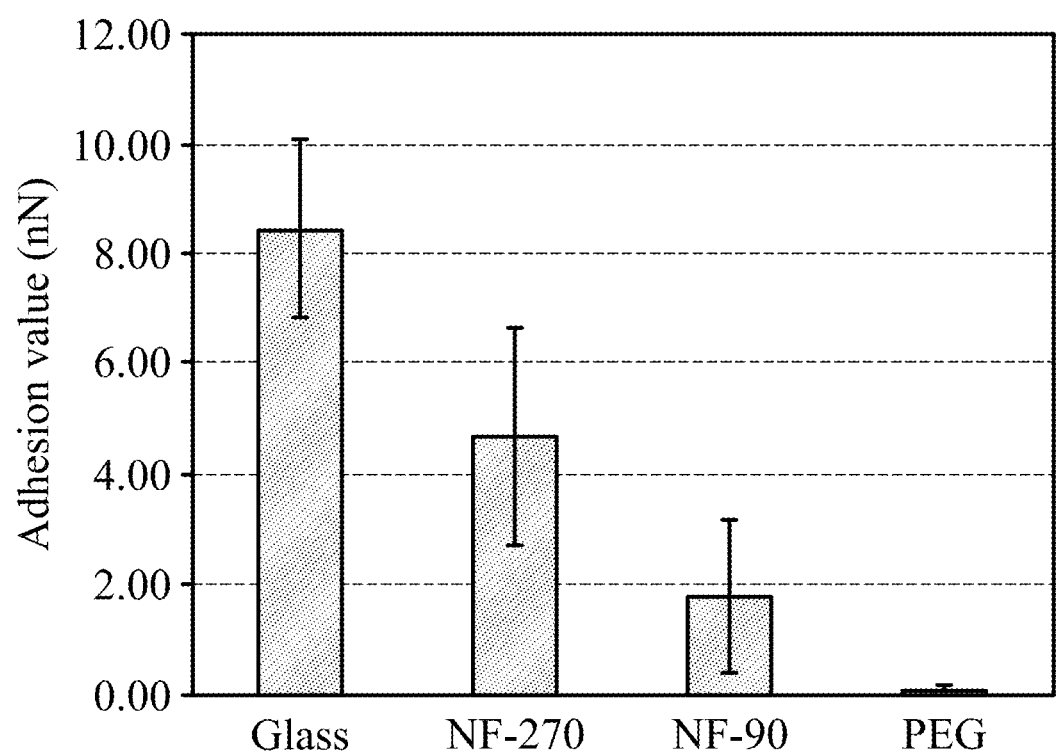
FIG. 6 shows the adhesion value of bovine serum albumin probe to the surface of a variety of goods and reference values according to an embodiment of the disclosure.

Using to the above method, the adhesion value of the probe to various test material surfaces is determined, and the results are shown in FIG. 6.

According to FIG. 6, glass is classified as no antifouling performance; its adhesion value of probe nearly was 8 nN, and general often used membrane NF-270, its adhesion value of the probe is less than 8 nN, moreover, commercial membrane NF-90, its adhesion value to the probe of between 0.6-3 nN, The PEG membrane, its adhesion value to the probe of between 0-0.6 nN. Hence, according to the results above, the corresponding antifouling ability is classified as no antifouling performance when the adhesion value is more than 8 nN; classified as poor antifouling performance when the adhesion value is 3-8 nN; classified as fair antifouling performance when the adhesion value is 0.6-3 nN; and classified as good antifouling performance when the adhesion value is 0-0.6 nN.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A method for determining antifouling ability of a material surface, comprising:
    (a) providing a determining device, wherein the determining device includes:
        a probe, wherein the probe includes a micro particle or includes a micro particle and a pollutant fixed on a surface of the micro particle; and
        a determining unit with a spring characteristic structure, wherein the probe is fixed at one end of the spring characteristic structure;
    (b) contacting the probe with a material surface-to-be-determined to make the micro particle itself or the pollutant on the surface of the micro particle adhere to the material surface-to-be-determined;
    (c) deforming the spring characteristic structure until the probe departs from the material surface-to-be-determined to recover the spring characteristic structure, and determining a level of the deformation using the determining unit;
    (d) determining an adhesion value of the probe to the material surface-to-be-determined using the deformation; and
    (e) determining antifouling ability of the material surface according to the adhesion value.

2. The method for determining antifouling ability of a material surface as claimed in claim 1, wherein the shape of the micro particle comprises a sphere, tip, pillar, taper, or taper.

3. The method for determining antifouling ability of a material surface as claimed in claim 1, wherein the material of the micro particle comprises silicon dioxide, glass, metal, metal coated substrates, polystyrene, poly (methyl methacrylate), melamine, or polylactic acid.

4. The method for determining antifouling ability of a material surface as claimed in claim 1, wherein the pollutant comprises an inorganic substance, organic acid, proteins, carbohydrates, or microorganisms.

5. The method for determining antifouling ability of a material surface as claimed in claim 4, wherein the inorganic substance comprises silicon oxide, calcium oxide, aluminum oxide or iron oxide.

6. The method for determining antifouling ability of a material surface as claimed in claim 4, wherein the organic acid comprises humic acid, or fulvic acid.

7. The method for determining antifouling ability of a material surface as claimed in claim 4, wherein the carbohydrate comprises chitosan.

8. The method for determining antifouling ability of a material surface as claimed in claim 1, wherein the pollutant is comes from a water source.

9. The method for determining antifouling ability of a material surface as claimed in claim 8, wherein the water source comprises fresh water, or brackish water.

10. The method for determining antifouling ability of a material surface as claimed in claim 8, wherein the pollutant coming from a water source comprises an inorganic substance, organic acid, proteins, carbohydrates, or microorganisms.

11. The method for determining antifouling ability of a material surface as claimed in claim 10, wherein the inorganic substance comprises silicon oxide, calcium oxide, aluminum oxide or iron oxide.

12. The method for determining antifouling ability of a material surface as claimed in claim 10, wherein the organic acid comprises humic acid, or fulvic acid.

13. The method for determining antifouling ability of a material surface as claimed in claim 10, wherein the carbohydrate comprises chitosan.

14. The method for determining antifouling ability of a material surface as claimed in claim 8, wherein steps (a)-(c) are carried out in water.

15. The method for determining antifouling ability of a material surface as claimed in claim 1, wherein a surface coverage of the pollutant on the micro particle is 50-100%.

16. The method for determining antifouling ability of a material surface as claimed in claim 1, wherein the spring characteristic structure comprises a cantilever, or laser optical tweezers.

17. The method for determining antifouling ability of a material surface as claimed in claim 1, wherein the determining the level of deformation detected by the determining unit is output from the determining unit in a form of voltage or offset value.

18. The method for determining antifouling ability of a material surface as claimed in claim 1, wherein the step (e) comprises:
    providing a reference value which shows corresponding antifouling ability to a range of adhesion values; and
    comparing the adhesion value and the references values to determine antifouling ability of the material surface.

19. The method for determining antifouling ability of a material surface as claimed in claim 18, wherein the corresponding antifouling ability is classified as no antifouling performance when the adhesion value is more than 8 nN; classified as poor antifouling performance when the adhesion value is 3-8 nN; classified as fair antifouling performance when the adhesion value is 0.6-3 nN; and classified as good antifouling performance when the adhesion value is 0-0.6 nN.

* * * * *